(12) United States Patent
Tang

(10) Patent No.: US 7,979,100 B2
(45) Date of Patent: Jul. 12, 2011

(54) SLIDING MECHANISM FOR CELLULAR PHONE

(75) Inventor: Yu-Chu Tang, Taipei (TW)

(73) Assignee: Arima Communications Corp., Taipei (TW)

( * ) Notice: Subject to any disclaimer, the term of this patent is extended or adjusted under 35 U.S.C. 154(b) by 572 days.

(21) Appl. No.: 12/145,916

(22) Filed: Jun. 25, 2008

(65) Prior Publication Data

US 2009/0325656 A1 Dec. 31, 2009

(51) Int. Cl.
*H04M 1/00* (2006.01)
(52) U.S. Cl. ............. 455/575.4; 455/566; 455/90.3; 455/575.3; 455/575.1; 379/433.11; 379/433.12
(58) Field of Classification Search .......... 455/575.4, 455/566, 90.3, 575.3, 575.1; 379/433.11, 379/433.12
See application file for complete search history.

(56) References Cited

U.S. PATENT DOCUMENTS

| 7,003,104 | B2 * | 2/2006 | Lee ........................... 379/433.13 |
| 7,813,776 | B2 * | 10/2010 | Lee et al. .................. 455/575.4 |
| 7,853,301 | B2 * | 12/2010 | Kim et al. ................. 455/575.4 |
| 2008/0261659 | A1 * | 10/2008 | Jang et al. ................. 455/566 |

* cited by examiner

*Primary Examiner* — Sanh D Phu
(74) *Attorney, Agent, or Firm* — Muncy, Geissler, Olds & Lowe, PLLC

(57) ABSTRACT

A sliding mechanism for a cellular phone includes a low-profile base provided on one surface with a central recess and a pair of parallel elongated sliding slots located at two lateral sides of the recess; a supporting bracket slidably connected to the surface of the base with the recess; and a plurality of flat elastic members each having a first and a second telescopic element respectively pivotally connected to the base and the supporting bracket. The base is enclosed in a plastic material through insert molding to have a slim body that enables a reduced overall thickness of the cellular phone. And, the flat elastic members allow the supporting bracket to smoothly slide relative to the base in a balanced manner.

4 Claims, 7 Drawing Sheets

A sliding mechanism for cellular phone relates to a sliding mechanism mounted between a lower and an upper case of a slide cellular phone, and more particularly to a sliding mechanism that ensures a balanced sliding of upper and lower cases of a slide cellular phone relative to each other while enables a reduced overall thickness of the cellular phone.

SLIDING MECHANISM FOR CELLULAR PHONE

FIELD OF THE INVENTION

The present invention relates to a sliding mechanism mounted between a lower and an upper case of a slide cellular phone, and more particularly to a sliding mechanism that ensures a balanced sliding of upper and lower cases of a slide cellular phone relative to each other while enables a reduced overall thickness of the cellular phone.

BACKGROUND OF THE INVENTION

The cellular phone has become a prerequisite information product among people living in the modern society, and almost everyone owns a cellular phone now. Among others, the recently developed slide cellular phone has become one of the most widely welcome types of cellular phones among general consumers. The slide cellular phone is internally provided with a sliding mechanism to enable an upper case of the cellular phone to slide relative to a lower case. However, the currently available slide cellular phones still have many disadvantages that require improvement. FIG. 9 is a plan view of a conventional sliding mechanism for a slide cellular phone. As shown, the sliding mechanism includes a lower plate 60, an upper plate 62 slidably connected to a top of the lower plate 60, and an extension arm 63. On the lower plate 60, there is provided an upward projected boss 68, a turn section 70, and a slot 71 having a roller 69 located therein. The extension arm 63 includes a stationary seat 64 connected to the boss 68 on the lower plate 60, a movable seat 65 fitted around the roller 69, two bars 66 each having a first end extended into the stationary seat 64 and a second end fixedly connected to the movable seat 65, and two springs 67 mounted around the two bars 66 to locate between the stationary seat 64 and the movable seat 65.

By pushing the upper plate 62, the upper plate 62 may slide to displace on the lower plate 60. When the roller 69 approaches the turn section 70, a bottom of the roller 69 is caused to move along the edges of the turn section 70 while a top of the roller 69 moves inward along the turn section 70. At this point, the springs 67 are compressed to store elastic energy. When the roller 69 passes through the apex of the turn section 70 and slides to an inclined surface of the turn section 70, the roller 69 starts sliding downward and brings the upper case of the slide cellular phone to an open position as shown in FIG. 9.

The above-described conventional sliding mechanism for cellular phone including a lower plate 60, an upper plate 62, and an extension arm 63 would have a relatively large thickness, which together with other components would largely increase the overall thickness of the cellular phone, making the cellular phone no longer a compact information product satisfying the main features of being small, slim, and light. Moreover, the extension arm 63 is the only member for actuating the conventional sliding mechanism, the upper plate 62 might slide in an unbalanced and unsmooth manner. And, the springs 67 are subject to elastic fatigue, deformation, or elastic failure when the sliding mechanism operates in the unbalanced condition over a long time.

SUMMARY OF THE INVENTION

A primary object of the present invention is to provide a sliding mechanism that ensures a balanced sliding of upper and lower cases of a slide cellular phone relative to each other while enables a reduced overall thickness of the cellular phone.

To achieve the above and other objects, the sliding mechanism for cellular phone according to the present invention includes a low-profile base being provided on one surface with a central recess and at least two elongated sliding slots parallelly located at two lateral sides of the recess, and each of the sliding slots having a first end and a second end; a supporting bracket being connected to the surface of the base with the recess and being slidable relative to the base; at least one slide being slidably installed in each of the two sliding slots on the base while being connected to the supporting bracket, such that the supporting bracket is slidable to displace relative to the base; and a plurality of flat elastic members being located between the base and the supporting bracket, each of the flat elastic members having a first telescopic element pivotally turnably connected to the base, a second telescopic element pivotally turnably connected to the supporting bracket, and at least two springs located between the first and the second telescopic element. The base is formed through insert molding and therefore has a slim body, which enables a reduced overall thickness of the slide cellular phone. And, since a plurality of flat elastic members is located between the base and the supporting bracket, the supporting bracket may slide relative to the base in a balanced manner to ensure an extended usable life of the elastic members.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
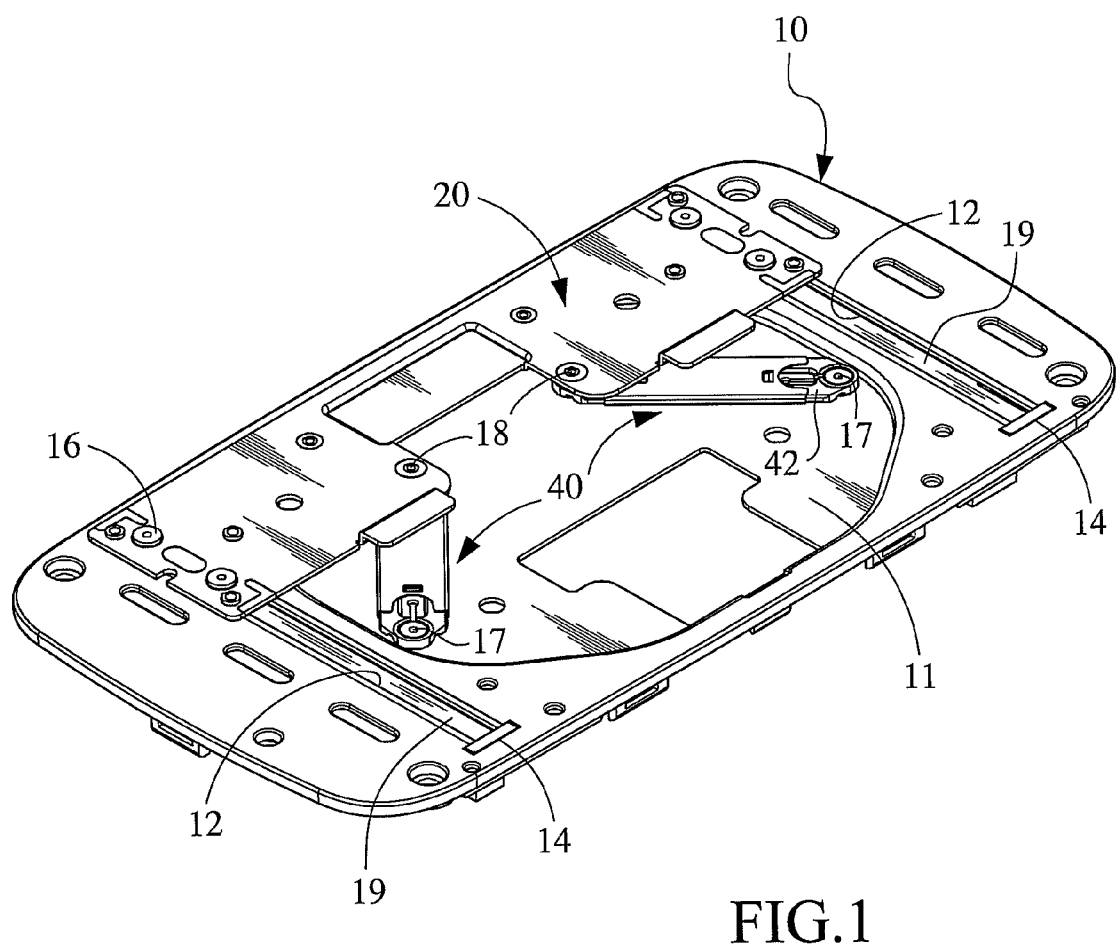
FIG. 1 is an assembled perspective view of the sliding mechanism for cellular phone according to a preferred embodiment of the present invention.
Figure 2:
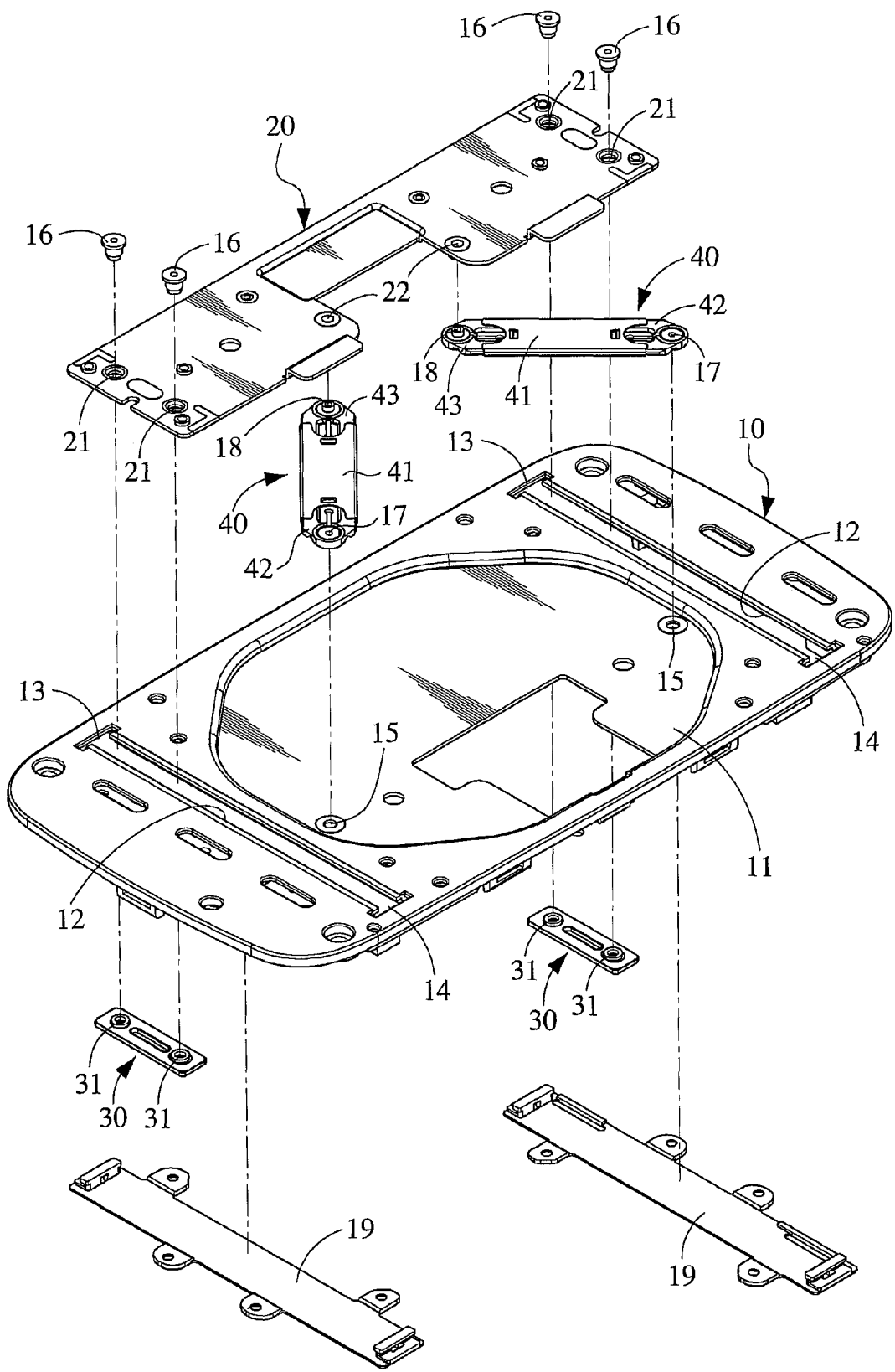
FIG. 2 is an exploded view of FIG. 1.
Figure 3:
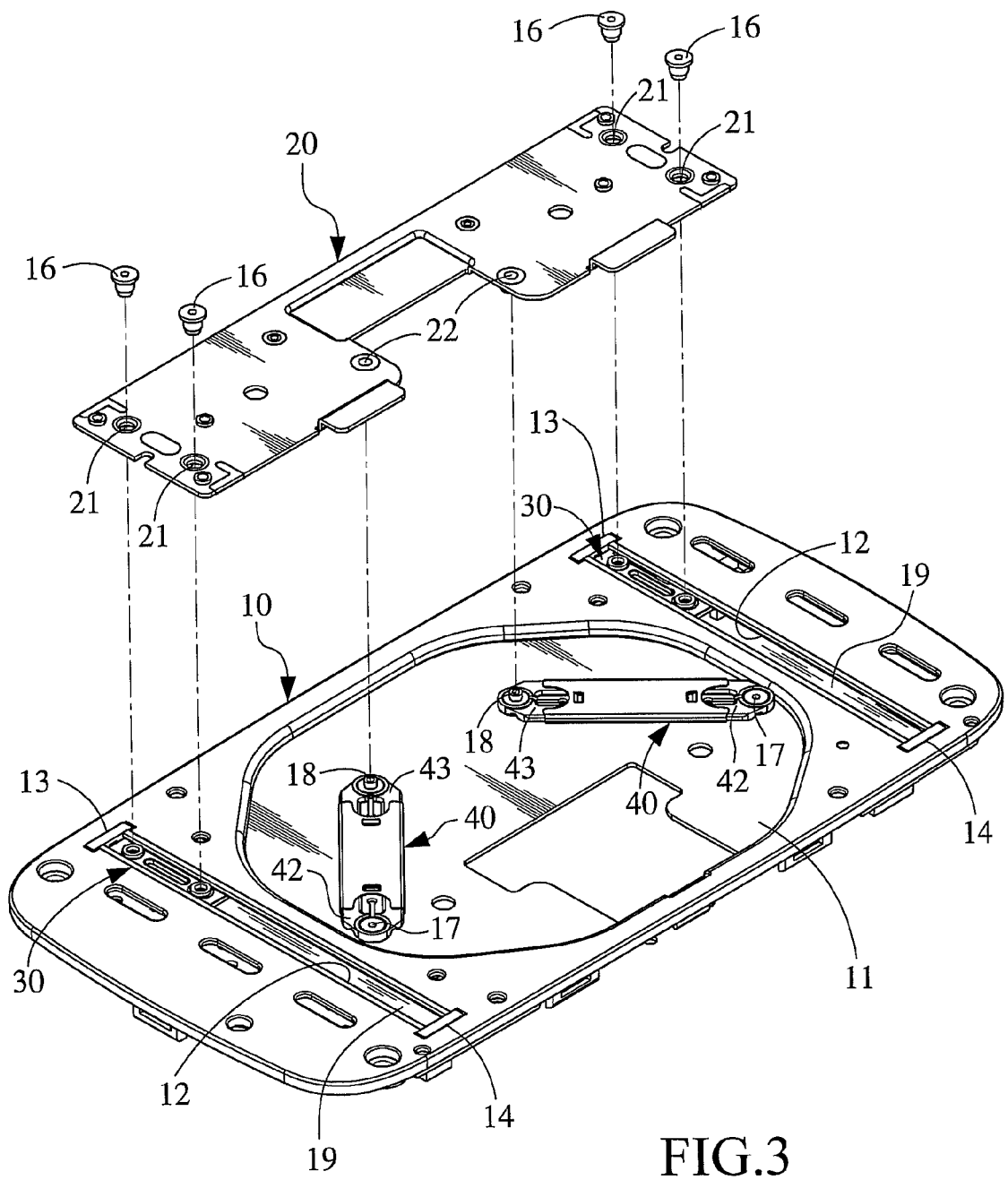
FIG. 3 is a partially exploded perspective view of FIG. 1 with a supporting bracket separated from a base of the sliding mechanism.

Please refer to FIGS. 1 and 2 that are assembled and exploded perspective views, respectively, of a sliding mechanism for cellular phone according to a preferred embodiment of the present invention, and to FIG. 3 that is a partially exploded view of FIG. 1. As shown, the present invention includes a low-profile base 10, a supporting bracket 20, at least two slides 30, and a plurality of flat elastic members 40.

The base 10 includes a plate which is associated with and enclosed in a plastic material through insert molding to form a low-profile structure. The base 10 is provided on one surface at a central area with a recess 11 and at least one pair of elongated closed sliding slots 12 parallelly arranged at two lateral sides of the recess 11. The sliding slots 12 each have a first end 13 and an opposite second end 14. A plurality of fixing holes 15 is provided at predetermined positions in the recess 11. As can be seen from FIG. 2, the illustrated embodiment of the present invention has two fixing holes 15 separately located in the recess 11 close to a boarder thereof.

The supporting bracket 20 is connected to the surface the base 10 provided with the recess 11, and is provided at predetermined positions with a plurality of first through holes 21 and a plurality of second through holes 22.

Figure 7:
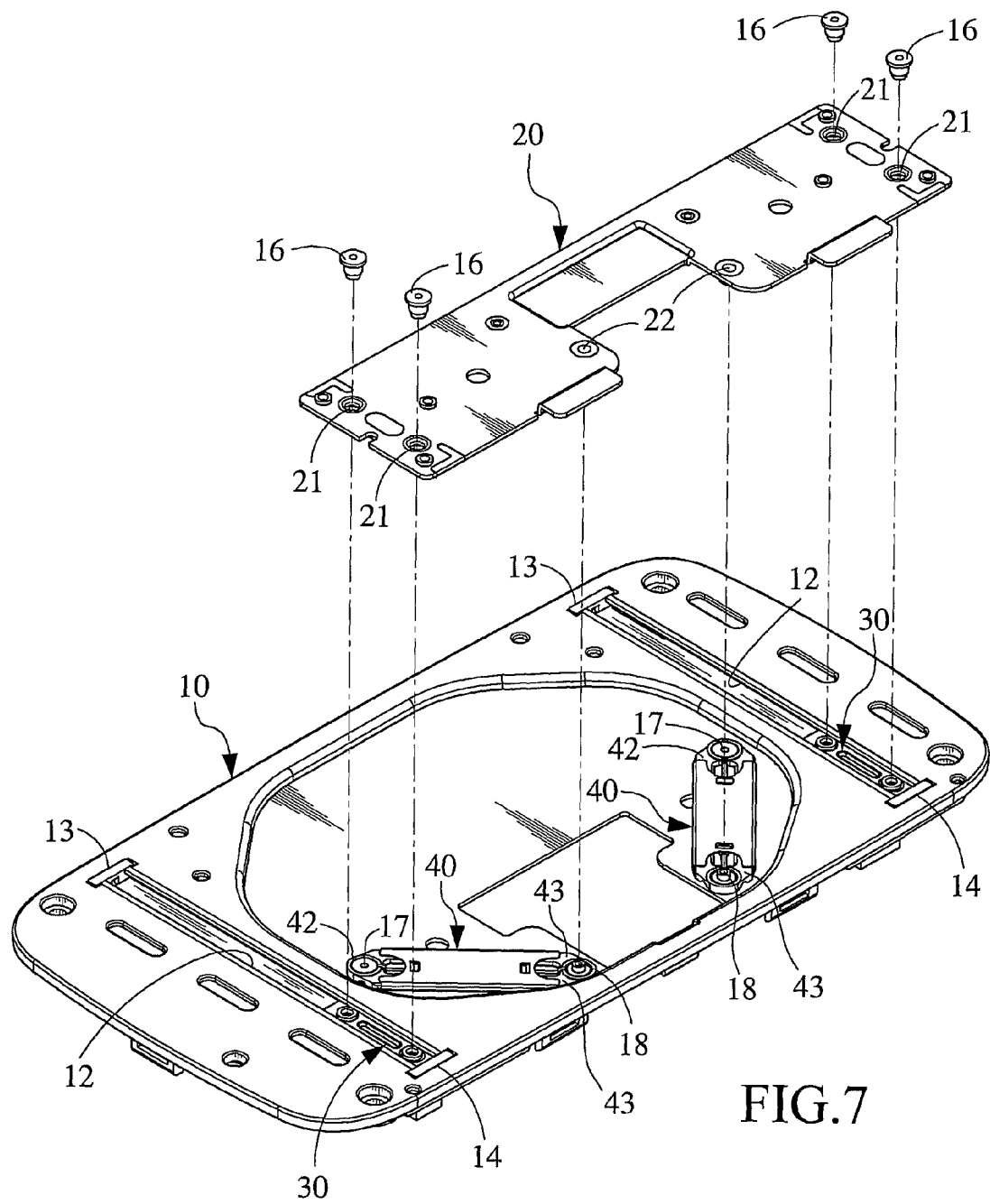
FIG. 7 is a partially exploded view of FIG. 6 with the supporting bracket separated from the base.

The slides 30 are separately slidably installed in the two sliding slots 12, and are movable between the first end 13 and the second end 14 of the sliding slots 12 as shown in FIGS. 3 and 7. The slides 30 each include a plurality of connecting holes 31. Fastening elements 16 are separately sequentially extended through the first through holes 21 on the supporting bracket 20 and the connecting holes 31 on the slide 30 and then riveted to fixedly connect the supporting bracket 20 with the slides 30.

Figure 4:
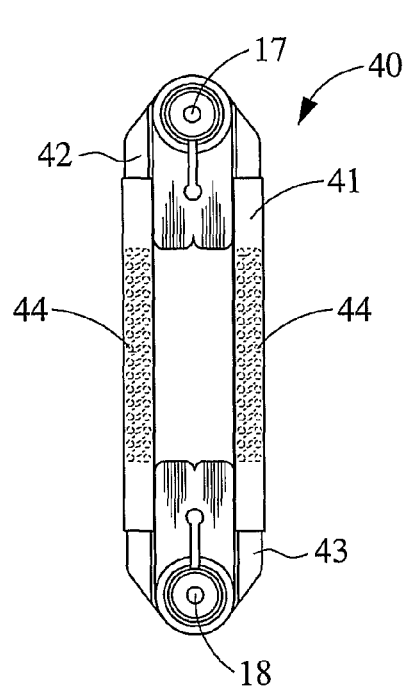
FIG. 4 is a rear plan view of a flat elastic member adopted in the present invention.
Figure 5:
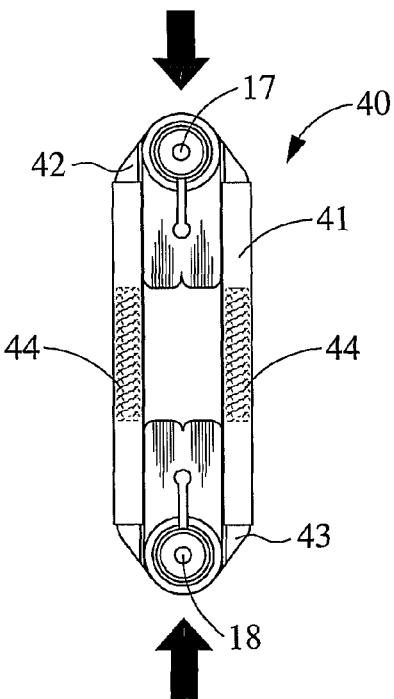
FIG. 5 shows the flat elastic member of FIG. 4 in a compressed state.

The flat elastic members 40 are located between the base 10 and the supporting bracket 20. In the illustrated embodiment, there are two flat elastic members 40. Please also refer to FIG. 4. Each of the flat elastic members 40 includes a flat main body 41, a first telescopic element 42 and a second telescopic element 43 separately telescopically mounted in two opposite ends of the main body 41, and at least two springs 44 installed inside the flat main body 41 to locate between the first and the second telescopic element 42, 43. The first telescopic element 42 is provided with a locating boss 17, which is inserted in and riveted to one corresponding fixing hole 15 on the base 10, so that the first telescopic element 42 is pivotally turnably connected to the base 10. Similarly, the second telescopic element 43 is provided with a locating boss 18, which is inserted in and riveted to one corresponding second through hole 22 on the supporting bracket 20, so that the second telescopic element 43 is pivotally turnably connected to the supporting bracket 20. When the first and the second telescopic element 42, 43 on each of the flat elastic members 40 are subjected to an inward compression each, the first and the second telescopic element 42, 43 would be moved inward along the flat main body 41 to compress the springs 44, as shown in FIG. 5.

The base 10 further includes a dust shield 19 for mounting to a bottom of each of the sliding slots 12, protecting the sliding slots 12 against accumulated dust to ensure smooth sliding of the slides 30 in the sliding slots 12 over a long period of time.

Figure 6:
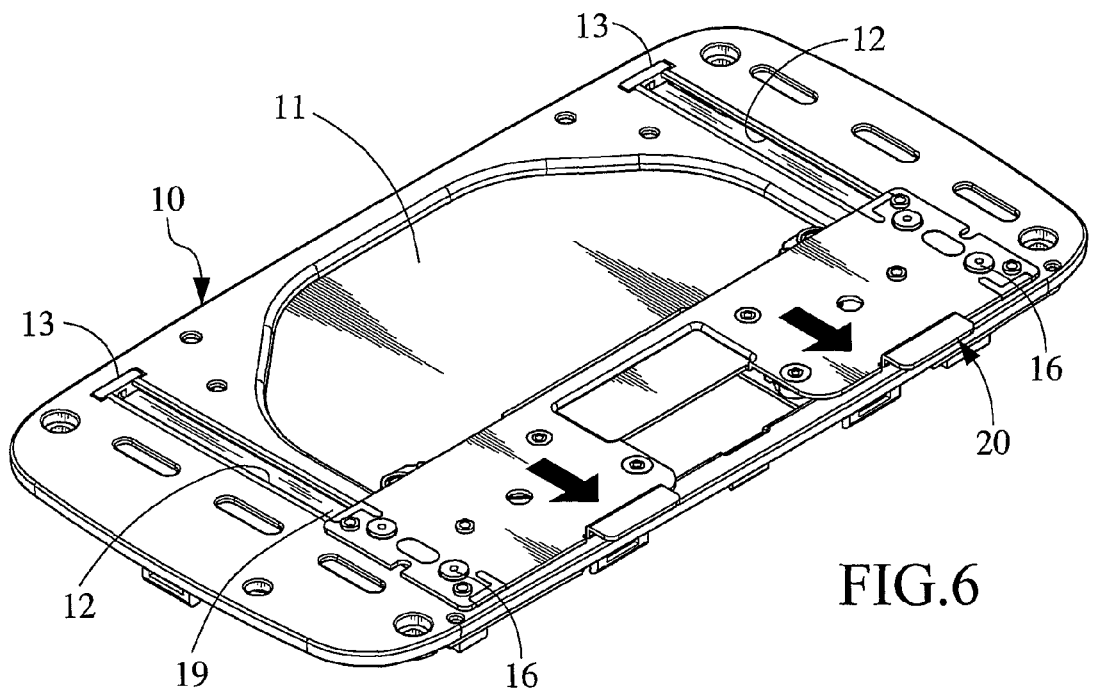
FIG. 6 shows the supporting bracket is pushed to locate at an open position.

As can be seen from FIG. 1, the supporting bracket 20 is initially located at a close position with the slides 30 located at the first ends 13 of the sliding slots 12. And, as can be seen from FIG. 6, the supporting bracket 20 at the close position may be pushed to an opposite open position with the slides 30 located at the second ends 14 of the sliding slots 12. When the supporting bracket 20 is moving from the close to the open position, each of the flat elastic members 40 is brought to pivotally turn about the locating boss 17 on the first telescopic element 42 along a curved path, forcing the first and the second telescopic element 42, 43 to continuously move into the flat main body 41 toward one another. At this point, the springs 44 are pushed by the inward moved first and second telescopic elements 42, 43 into a compressed state, as shown in FIG. 5. When the two flat elastic members 40 pivotally turned with the displacement of the supporting bracket 20 finally reach a position at where the second telescopic elements 43 and the first telescopic elements 42 are located in the same horizontal axis on the base 10, a tension force of the springs 44 is sufficient to push the supporting bracket 20 to continuously move forward until the slides 30 reach the second ends 14 of the two sliding slots 12, as shown in FIG. 7.

Figure 8:
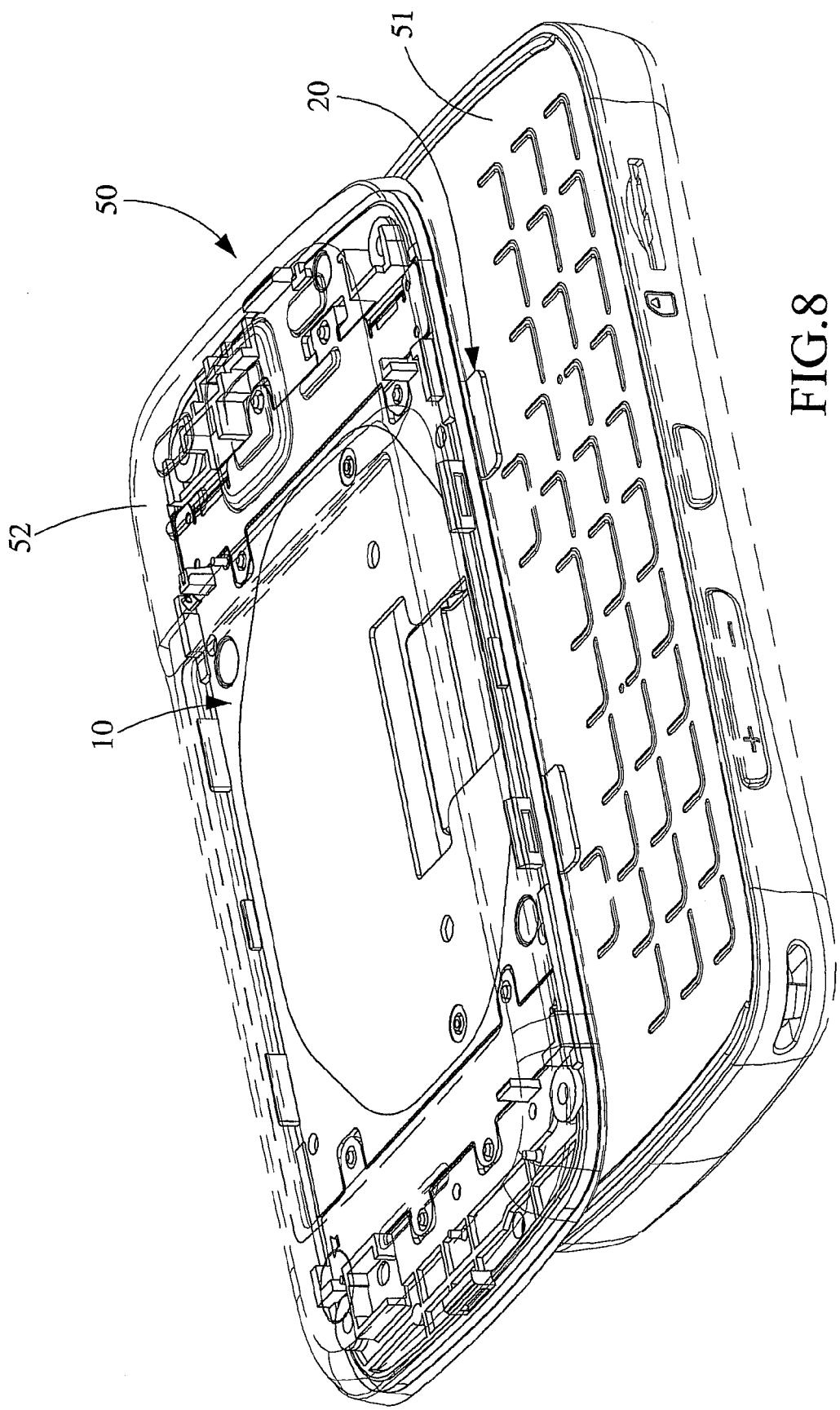
FIG. 8 shows the sliding mechanism of the present invention associated with a cellular phone.
Figure 9:
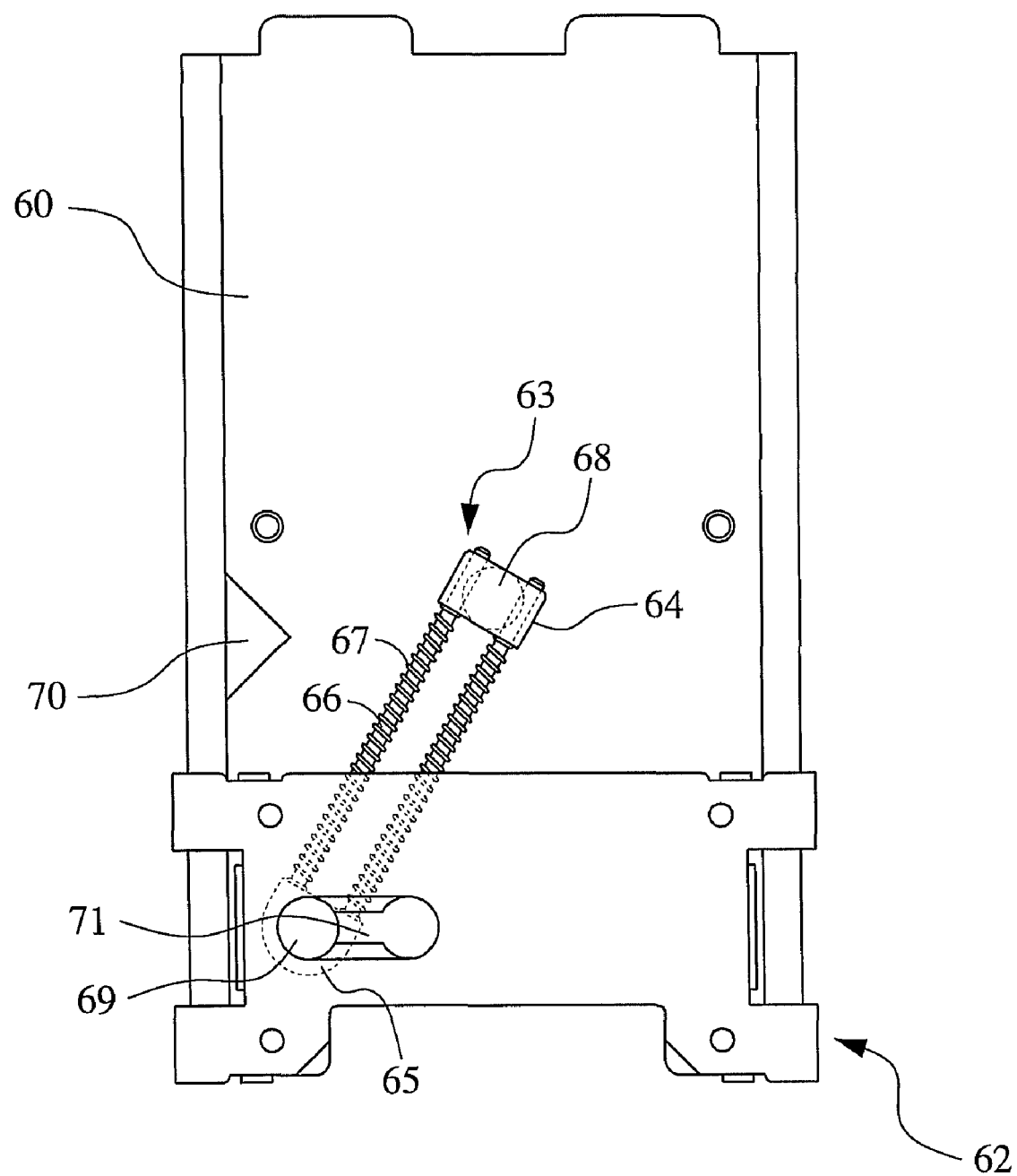
FIG. 9 is an assembled plan view of a conventional sliding mechanism for cellular phone.

FIG. 8 shows the use of the sliding mechanism of the present invention on a currently very popular slide cellular phone 50. The slide cellular phone 50 includes a lower case 51 and an upper case 52 located on a top of the lower case 51. The base 10 of the sliding mechanism of the present invention is screwed to the upper case 52, and the supporting bracket 20 to the lower case 51. To use the cellular phone 50, simply pull the lower case 51 forward for the upper case 52 to move rearward, and the flat elastic members 40 would bring the upper case 52 to automatically move away from the lower case 51 to expose the top of the lower case 51.

With the base 10 being formed by way of insert molding to have a slim body, an overall thickness of the cellular phone 50 may be largely reduced. And, with the plurality of flat elastic members 40, the supporting bracket 20 and the base 10 may slide relative to each other in a balanced and smooth manner to thereby ensure an extended usable life of the flat elastic members 40.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A sliding mechanism for cellular phone, comprising:
    a low-profile base being provided on one surface with a central recess and at least a pair of elongated sliding slots parallelly located at two lateral sides of the recess; and each of the sliding slots having a first end and a second end;
    a supporting bracket being connected to the surface of the base having the recess provided thereon;
    at least one slide being slidably installed in each of the two sliding slots on the base while being connected to the supporting bracket, such that the supporting bracket is slidable to displace relative to the base; and
    a plurality of flat elastic members being located between the base and the supporting bracket; each of the flat elastic members having a first telescopic element pivotally turnably connected to the base, a second telescopic element pivotally turnably connected to the supporting bracket, and at least two springs located between the first and the second telescopic element;
    whereby when the slides are slid in the sliding slots from the first ends toward the second ends, a tension force of the springs is sufficient to push the supporting bracket to continuously move until the slides reach the second ends of the sliding slots.

2. The sliding mechanism for cellular phone as claimed in claim 1, wherein the base includes a plate, which is associated with and enclosed in a plastic material through insert molding.

3. The sliding mechanism for cellular phone as claimed in claim 1, wherein the first telescopic elements each have a locating boss connected to the base, such that the flat elastic members are pivotally turned about the locating bosses to displace along a curved path when the supporting bracket is brought to move toward the second ends of the sliding slots.

4. The sliding mechanism for cellular phone as claimed in claim 1, further comprising a dust shield mounted to a bottom of each of the elongated sliding slots.

* * * * *